(12) United States Patent
Tsai et al.

(10) Patent No.: US 12,525,115 B2
(45) Date of Patent: Jan. 13, 2026

(54) LENS DISTANCE TEST FOR HEAD-MOUNTED DISPLAY DEVICES

(71) Applicant: Apple Inc., Cupertino, CA (US)

(72) Inventors: Chia-Yin Tsai, Sunnyvale, CA (US); Kai Benjamin Quack, San Mateo, CA (US); Hua Gao, San Jose, CA (US); Tom Sengelaub, Oakland, CA (US); Alper Yildirim, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 18/470,748

(22) Filed: Sep. 20, 2023

(65) Prior Publication Data

US 2024/0105046 A1    Mar. 28, 2024

Related U.S. Application Data (60) Provisional application No. 63/376,954, filed on Sep. 23, 2022.

(51) Int. Cl.
| | |
|---|---|
| *G08B 21/18* | (2006.01) |
| *G02B 27/01* | (2006.01) |
| *G06F 3/01* | (2006.01) |
| *G06T 7/70* | (2017.01) |

(52) U.S. Cl.
CPC ....... *G08B 21/182* (2013.01); *G02B 27/0172* (2013.01); *G06F 3/013* (2013.01); *G06T 7/70* (2017.01)

(58) Field of Classification Search
CPC .... G08B 21/182; G06T 7/70; G02B 27/0172; G06F 3/013

USPC ....................................................... 340/686.1
See application file for complete search history.

(56) References Cited

U.S. PATENT DOCUMENTS

| | | | | |
|---|---|---|---|---|
| 9,025,252 | B2 * | 5/2015 | Lewis ................. | H04N 13/344 |
| | | | | 359/13 |
| 10,277,893 | B1 * | 4/2019 | Yoon ..................... | H04N 23/90 |
| 10,345,600 | B1 * | 7/2019 | Chi ........................ | G02B 27/017 |
| 10,401,625 | B2 * | 9/2019 | Petrov ................... | A61B 3/152 |
| 10,430,939 | B1 * | 10/2019 | Levin ..................... | G02B 27/62 |
| 10,635,169 | B2 * | 4/2020 | Gustafsson ........... | G06F 3/0304 |
| 10,698,481 | B1 * | 6/2020 | Najafi Shoushtari .. | G06V 20/20 |
| 11,960,643 | B2 * | 4/2024 | Choi ..................... | H04N 13/344 |
| 2016/0063919 | A1 * | 3/2016 | Ha ........................ | G09G 3/3225 |
| | | | | 345/76 |

(Continued)

*Primary Examiner* — Zhen Y Wu (74) *Attorney, Agent, or Firm* — Robert C. Kowert; Kowert, Hood, Munyon, Rankin & Goetzel, P.C.

(57) ABSTRACT

Systems and methods are disclosed to enable performance of a lens distance test in head-mounted displays (HMDs) to determine the distance between a user's eye and a lens of the HMD (e.g. the display lens in a virtual or augmented reality device). In embodiments, the HMD is configured to determine a current pose of the eye based on a series of captured eye images. The pose information is used to determine the distance from the apex of the cornea to a closest point on the lens. If the determined distance is too small or too large, an alert or notification is generated instructing to adjust the HMD or change the light seal to achieve better distancing, in order to reduce the risk of eye injury and/or improve user experience. In embodiments, the lens distance test may be repeated during a user session to reevaluate and/or monitor the lens distance.

19 Claims, 5 Drawing Sheets

(56) References Cited

U.S. PATENT DOCUMENTS

| | | | |
|---|---|---|---|
| 2017/0123210 A1* | 5/2017 | Blanco | G06F 3/013 |
| 2017/0184847 A1* | 6/2017 | Petrov | H04N 23/56 |
| 2018/0173303 A1* | 6/2018 | Liu | G06F 1/325 |
| 2019/0025815 A1* | 1/2019 | Saadoun | G06F 3/0383 |
| 2019/0056590 A1* | 2/2019 | Chuang | H04N 13/344 |
| 2020/0093362 A1* | 3/2020 | Jackson | A61B 3/028 |
| 2020/0134867 A1* | 4/2020 | Zachrisson | G06T 7/74 |
| 2020/0275087 A1* | 8/2020 | Yasuda | H04N 13/344 |
| 2020/0400948 A1* | 12/2020 | Maric | G02B 27/0176 |
| 2021/0096363 A1* | 4/2021 | Lee | G02B 27/0101 |
| 2022/0160223 A1* | 5/2022 | Bradley | G02B 27/0176 |
| 2022/0197378 A1* | 6/2022 | Song | G02B 27/0172 |
| 2023/0134442 A1* | 5/2023 | Sharma | H04N 23/56 348/78 |
| 2023/0359270 A1* | 11/2023 | Choi | G06F 3/013 |

\* cited by examiner

LENS DISTANCE TEST FOR HEAD-MOUNTED DISPLAY DEVICES

This application claims benefit of priority to U.S. Provisional Application Ser. No. 63/376,954, entitled "LENS DISTANCE TEST FOR HEAD-MOUNTED DISPLAY DEVICES," filed Sep. 23, 2022, and which is hereby incorporated herein by reference in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) or augmented reality (AR) systems combine computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for performing a lens distance test in head-mounted displays (HMDs), such as AR or VR headsets. The distance test is performed to determine the distance between a user's eye and a lens of the HMD (e.g. the display lens of the HMD or a clip-on lens). In some embodiments, the HMD is configured to determine a current pose of the eye based on a series of captured eye images. The pose may be determined using a gaze tracking system implemented by the HMD, and is used by the HMD to determine the distance from the apex of the cornea to a closest point on the lens. If the determined distance is too small or too large, an alert or notification is generated instructing the user to adjust the position of the HMD or change the light seal to achieve better distancing, so as to reduce the risk of eye injury and/or improve the user experience. In some embodiments, the distance test may be repeated during a user session to reevaluate and/or monitor the lens distance.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus are described for performance of a lens distance test in head-mounted display (HMD) devices. HMDs may include devices such as headsets, helmets, goggles, or glasses, etc., that are designed to be worn by a user and include a display mechanism (e.g., left and right near-eye display panels) for displaying visual content to the user. In some embodiments, the display mechanism may include displays for both eyes of the user to provide 3D visual views to the user. In some embodiments, the HMD may be a virtual reality (VR) or augmented reality (AR) device. For AR applications, the HMD may include or be coupled to one or more external video cameras that capture video of the user's environment for display. The HMD may include a controller component that renders frames for display to the left and right displays. Alternatively, the controller component may be implemented by an external device that is coupled to the HMD via a wired or wireless connection.

In some embodiments, the HMD may include left and right optical lenses (e.g. display lenses) located between the display and the user's eyes. The distance between the user's eye (e.g. the cornea surface) and the display lens can have significant impacts on the user experience of the device. For example, on VR and AR headsets, the best user experience is typically achieved when the user's eyes are within an optimal range of distances from the lens. Moreover, a lens distance that is too small can raise safety concerns, such as potential injuries to the cornea when the user experiences a fall. To avoid such problems, embodiments of an HMD described herein are configured to perform an automatic lens distance test, and notify the user when the measured distance is too close or too far. In some embodiments, the notification may be generated as an alert that is visually displayed to the user, and recommends the user to adjust the HMD positioning or use a different light seal that better fits the user's facial structure. In some embodiments, the lens distance test may be performed during an initialization process of the HMD that occurs when the user first puts on the HMD. In some embodiments, the lens distance test may be repeated during a user session of the HMD, for example, when the HMD is detected to have moved relative to the user's eyes, or according to a periodic retesting schedule.

In some embodiments, the lens distance test may be performed using a gaze tracking system included in the HMD for detecting the gaze direction of the user's eyes. In some embodiments, the gaze tracking system may include at least one eye tracking camera (e.g., infrared (IR) or near-IR (NIR) cameras) positioned at each side of the user's face, and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking system may determine a current pose of the user's eye, which may indicate the apex location of the cornea. In some embodiments, the distance from the apex location to a nearest point on the lens is used as the lens distance. If the lens distance is too short of too long (e.g. outside of a pre-specified threshold or range), the HMD will generate an alert to the user.

Figure 1:
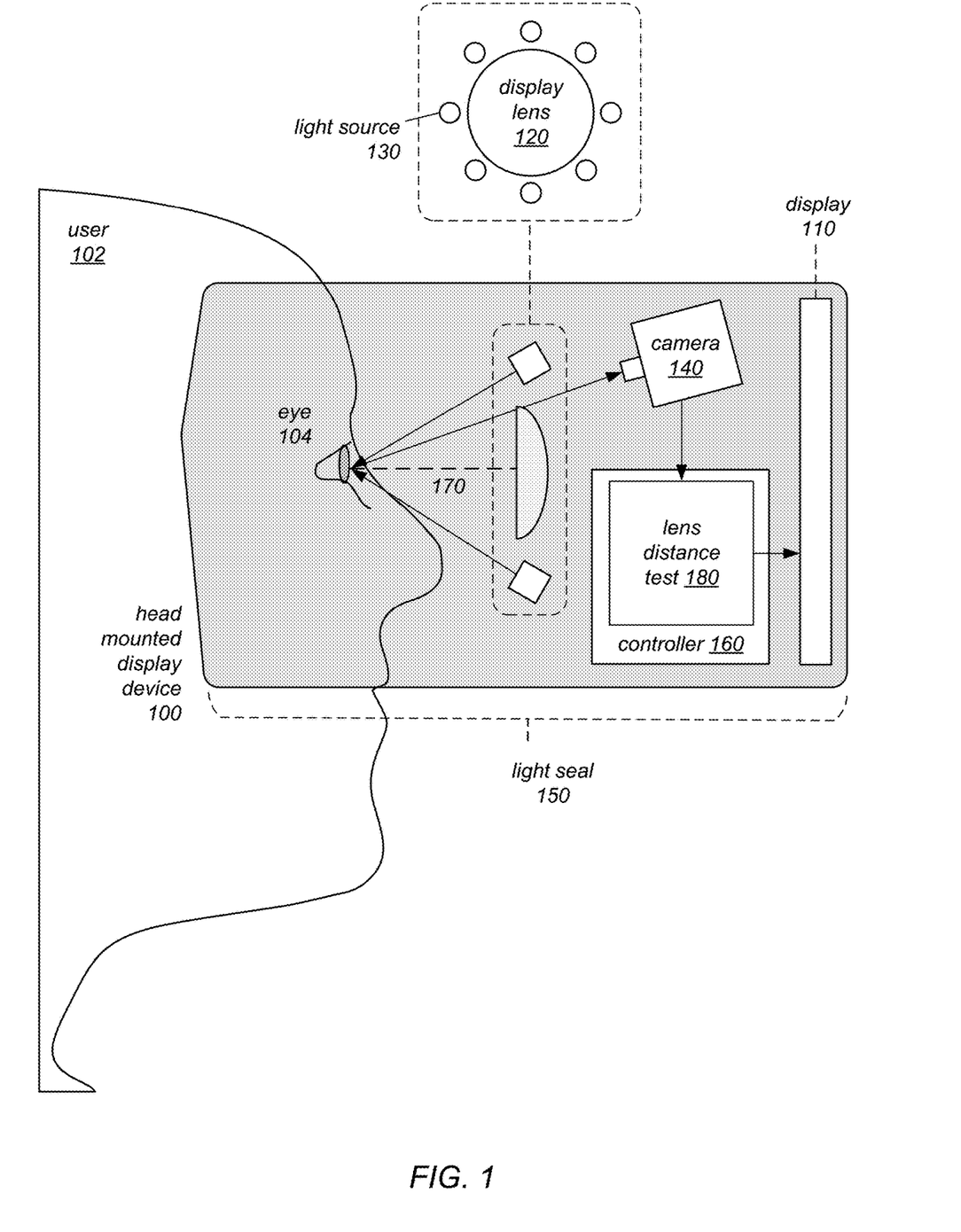
FIG. 1 illustrates a head mounted display (HMD) device that implements a lens distance test to determine the distance between the eye of a user and a lens of the HMD, according to some embodiments.

FIG. 1 illustrates an HMD device that implements a lens distance test to determine the distance between the eye of a user and a lens of the HMD, according to some embodiments.

As shown, the figure depicts an HMD device 100 worn by a user 102. The HMD 100 may include, but is not limited to, a display 110 (e.g., a left and right display panel), two display lenses 120, and a gaze tracking system that includes at least one eye tracking camera 140 (e.g., infrared (IR) or near-IR (NIR) cameras) positioned at each side of the user's face, and an illumination source 130 (e.g., IR or NIR light sources such as an array or ring of NIR light-emitting diodes (LEDs)) that emit light (e.g., IR or NIR light) towards the user's eyes 104. Depending on the eye tracking cameras 140 may be pointed towards mirrors located between the user's eyes 104 and the display 110 that reflect IR or NIR light from the eyes 104 while allowing visible light to pass, or alternatively pointed towards the user's eyes 104 to receive reflected IR or NIR light from the eyes 104 as shown in the figure.

As shown, the HMD 100 may include a light seal 150 that encloses light generated by the display 110 so that visual content generated by the display appears brighter to the user 102. The light seal 150 may also be fitted to the user 102, for example, adjusted to a particular shape to fit the user's facial structure or place the display 110 at a particular distance 170 from the user's eyes. In some cases, an HMD with a light seal 150 adapted for one user may not properly fit the facial structure of another user, so that the other user cannot achieve proper eye-to-lens distancing with the light seal.

In some embodiments, the HMD 100 may include a controller 160 that may be configured to render AR or VR content (e.g., left and right frames for left and right display panels) and provide the frames to the display 110. In some embodiments, the controller 160 may be integrated in the HMD. In some embodiments, the controller 160 may be a computer device with its own processors and memory. In some embodiments, at least some functionality of the controller 160 may be implemented by a device external to the HMD and coupled to the HMD by a wired or wireless connection. The user looks through the display lenses 120 onto the display 110 (e.g., on to left and right display panels through left and right display lenses 120).

In some embodiments, the controller 160 implements gaze tracking using eye tracking camera(s) 140 for various purposes. The controller 160 may estimate the user's point of gaze on the display 110 based on the gaze tracking input obtained from the eye tracking cameras 140 using glints or reflections from the eye produced by the light source(s) 130. The point of gaze estimated from the gaze tracking input may be used to determine the direction in which the user is currently looking.

As shown, in some embodiments, the light source(s) 130 may be arranged a circle around each of the display lenses 120. However, in other embodiments, more or fewer light sources 130 may be used, and other arrangements and locations of light sources 130 may be used. In some embodiments, the eye tracking cameras 140 may be pointed towards mirrors located between the user's eyes 104 and the display 110 to reflect IR or NIR light from the eyes 104 while allowing visible light to pass. In other embodiments, the light sources 130 may be pointed towards the user's eyes 104 to receive reflected IR or NIR light from the eyes 104, as shown.

As shown, in the controller 160 of the HMD 100 may implement a lens distance test 180. As discussed, this lens distance test 180 may be performed at various times during the operation of the HMD to determine the distance 170 between the user eye 104 and the display lens 120, and notify the user if the distance is outside a threshold or tolerance range. In some embodiments, these thresholds or tolerance ranges may be configurable via a configuration interface of the HMD 100. In some embodiments, the HMD may be configured with multiple distance thresholds. For example, exceeding a first threshold may only cause the HMD to generate a warning the lens is too close or too far, and exceeding a second threshold may prevent the HMD from operating altogether.

In some embodiments, the lens distance test 180 may be performed using the gaze tracking functionality of the HMD. For example, the gaze tracking system of the HMD may be configured to continuously determine the current pose of the eye 104 based on an eye model. In some embodiments, the eye model may implement a function that takes the eye images captured by the camera 140 (or the glint readings) and translates the data to a particular spatial configuration of the eye (e.g. the current positions of the cornea center, optical axis, pupil, etc.). In some embodiments, the lens distance test uses such an eye model to quickly determine the current pose of the eye, including the location of the cornea apex, which is the point of the cornea that protrudes furthest from the eyeball. In some embodiments, the lens distance test uses this apex location to determine the distance 170 from the eye to the lens.

Figure 2A:
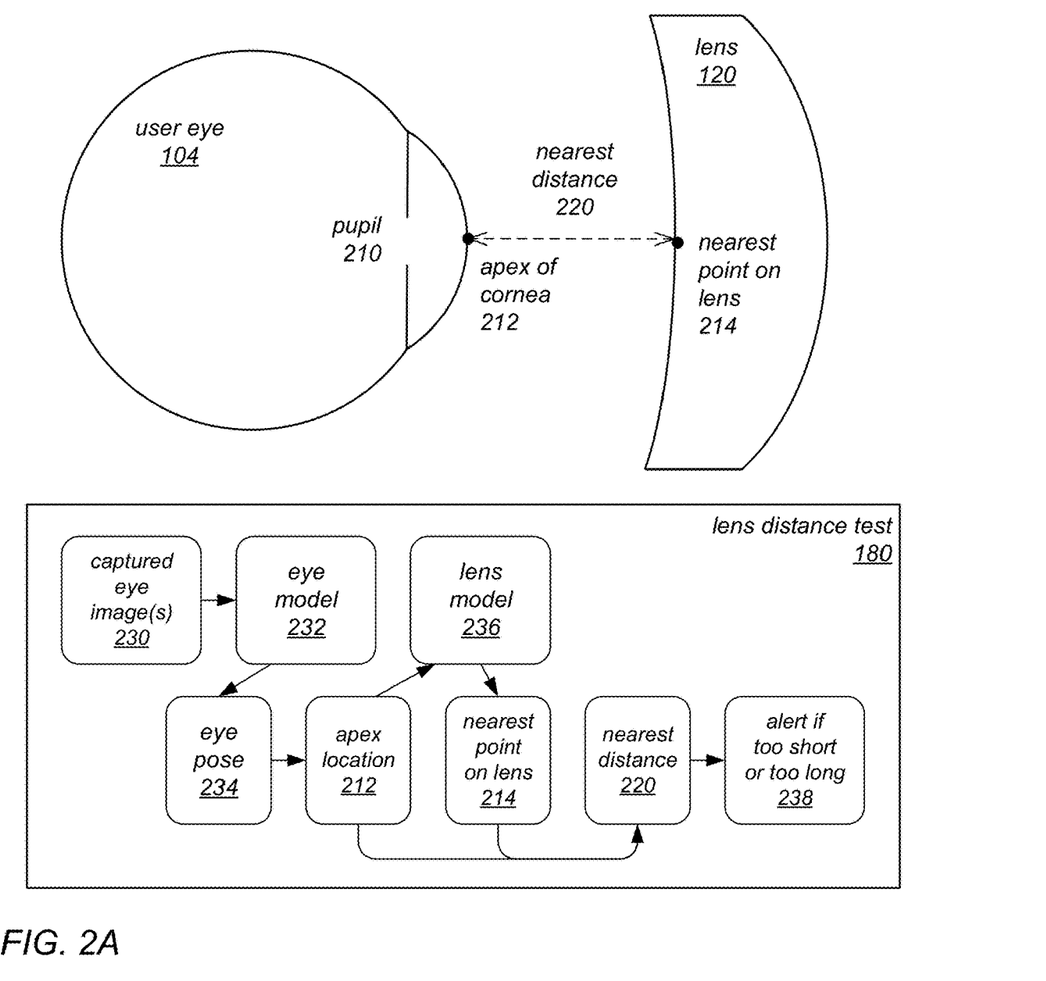
FIG. 2A illustrates steps in a lens distance test performed by the HMD, according to some embodiments.

FIG. 2A illustrates steps in a lens distance test performed by the HMD, according to some embodiments.

The top portion of FIG. 2A shows certain details about the user eye 104 and lens 120 of FIG. 1. As shown, the user eye 104 includes the pupil 210 and the apex of the cornea 212. The point on the lens 120 that is closest to the apex 212 is point 214. In some embodiments, the distance determined by the lens distance test 180 is the nearest distance 220 between the apex 212 and the nearest point 214 on the lens.

The bottom portion of FIG. 2A shows steps performed by a particular embodiment of the lens distance test 180. As shown, the process begins with the eye images 230 captured by the camera(s) 140. In some embodiments, these eye images 230 are reduced to a set of readings corresponding to the observed reflection or glint values generated by light sources 130.

The images or readings are fed into an eye model 232, which determines a current pose 234 of the eye. In some cases, the eye model 232 may be a user-specific model that was previously generated for a user, for example, during an enrollment process of the user. The HMD may determine that a current wearer of the device fits the eye model (e.g. based on a match of current eye images or a biometric authentication of the user), and elect to use the eye model to perform the lens distance test. In some embodiments, use of the eye model of a known user enhances the accuracy of the test. In other cases, the eye model 232 may be a general eye model that is not specific to any user. Such a general eye model may be based on an average of the eye features of many users, and can be used to perform the lens distance test with less accuracy. Use of the general eye model is useful in situations when the HMD is being used by someone other than the normal user of the device, which is typically when lens distancing issues can arise. Once the eye pose 234 is determined, the test determines the apex location 212 of the cornea of the eye. In some embodiments, the apex location 212 may be directly obtained from the eye model 232.

As shown, the test process next uses a lens model 236 to determine the nearest point 214 on the lens to the apex location. In some embodiments, the lens model 236 may represent the spatial shape of the lens 120 in a reference coordinate system, and the apex location 212 is also expressed in the same coordinate system. Depending on the embodiment, the coordinate system may be centered on the lens 120, the camera(s) 140, or some other point on the HMD. In some embodiments, the display lens 120 is fixed to the HMD, and the lens model 236 is determined by a factory calibration process of the HMD.

As shown, the test process next determines the nearest distance 220 using the apex location 212 and the nearest point on the lens 214. In some embodiments, this distance 220 is used as the lens distance 170. If the distance is too short or too long (e.g. shorter or longer than a distance threshold), the HMD will generate an alert 238. In some embodiments, the alert may be generated visually via the display on the HMD. In some embodiments, the alert will indicate that the lens distance is too close or too far, and instruct or recommend the user to either adjust the position of the HMD or use a different light seal. In some embodiments, if the user is not recognized as a known user of the HMD, the warning may ask the user to authenticate (so that a more accurate eye model can be used to retry the lens distance test), or enroll as a new user.

Figure 2B:
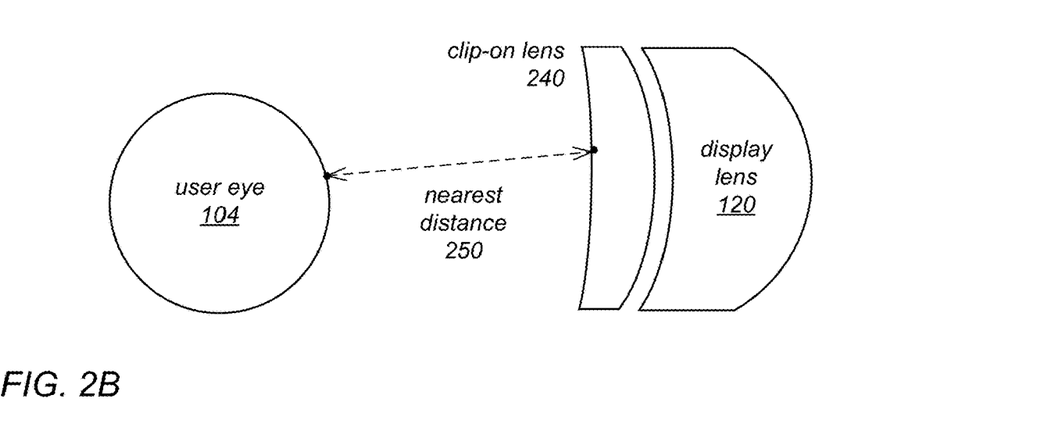
FIG. 2B illustrates a lens distance test that determines a distance from a user's eye to a clip-on lens added to the HMD, according to some embodiments.

FIG. 2B illustrates a lens distance test that determines a distance from a user's eye to a clip-on lens added to the HMD, according to some embodiments.

As shown, in this example, a clip-on lens 240 is inserted in front of the display lens 120. Such a clip-on lens 240 may not be a factory installed component of the HMD, but added in the field by a user. In some embodiments, the clip-on lens may be a corrective lens added to correct the vision of a particular user.

In some embodiments, when the clip-on lens 240 is added to the HMD, the HMD will perform a field calibration process to precisely determine the position of the clip-on lens relative to the HMD. This location data may be stored (e.g. as part of the lens model 236), so that it can be used to perform lens distance test 180. When a clip-on lens is present, the lens distance test will measure the nearest distance 250 from the eye 104 to the clip-on lens, instead of the display lens 120. In some embodiments, the distance thresholds for generating the alert may also be changed when a corrective lens is installed, so that the user is encouraged to properly distance the eyes in accordance with the characteristics of the corrective lens. In some embodiments, the lens distance test 180 may be performed as part of the field calibration process when a new clip-on lens is installed.

Figure 3:
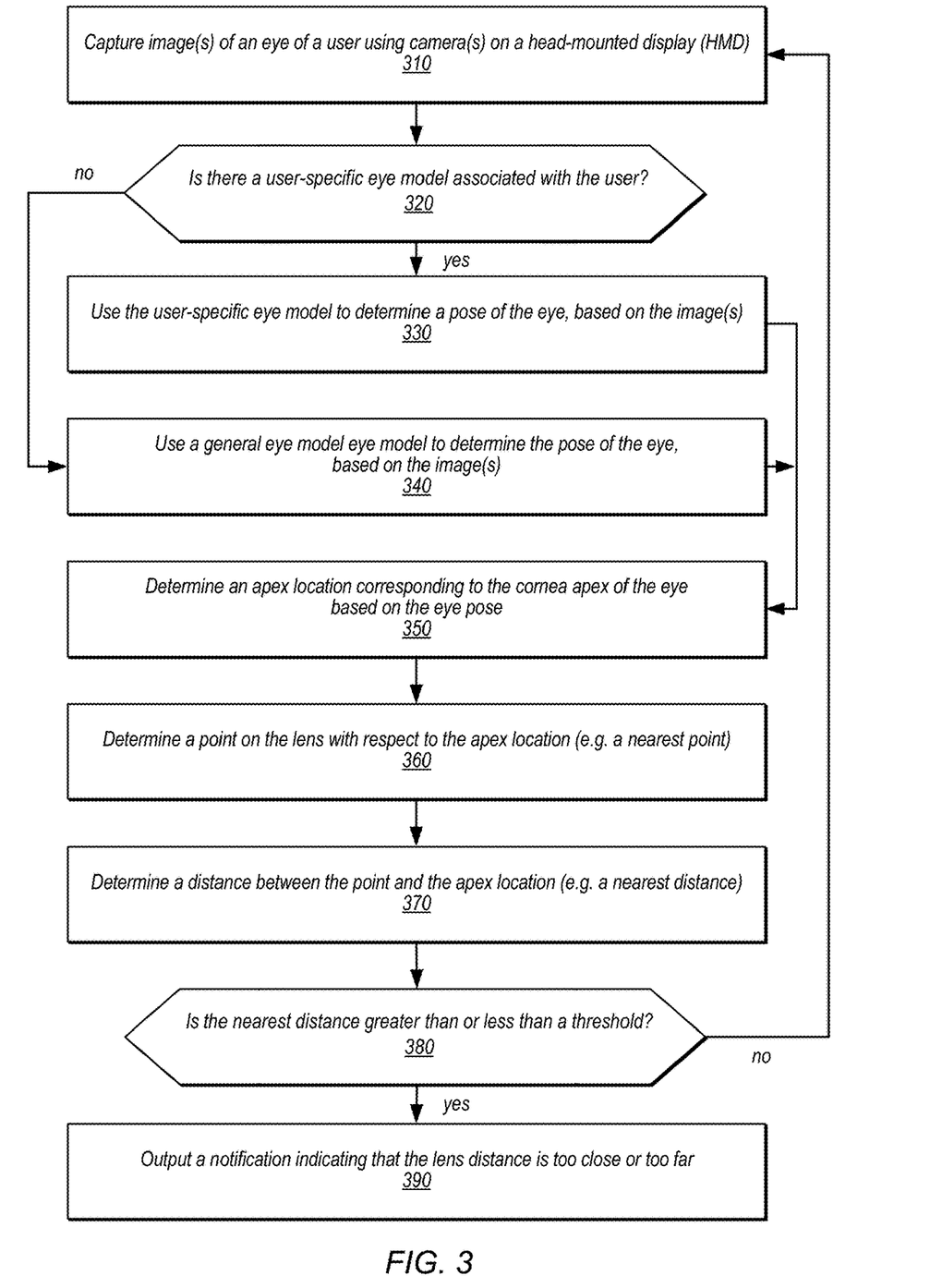
FIG. 3 is a flowchart illustrating the performance of a lens distance test, according to some embodiments.

FIG. 3 is a flowchart illustrating the performance of a lens distance test, according to some embodiments. The process shown in FIG. 3 may be performed by an embodiment of the HMD 100 of FIG. 1.

The process begins at operation 310, where image(s) of an eye of the user is captured using camera(s) (e.g. camera(s) 140) on the HMD. In some embodiments, the cameras may be part of a gaze tracking system implemented by the HMD, and the images may indicate reflections or glints produced by LED light sources positioned around the eye. In some embodiments, the image(s) may be taken at a single point in time and constitute one captured frame of the eye.

At operation 320, a determination is made whether a user-specific eye model associated with the user is available. In some embodiments, the eye model may be a function that takes the captured images or readings derived from the images to a particular pose of the eye. A user-specific eye model may be created during an enrollment process of the user. Such a user-specific eye model may be preferable to a general eye model because it can determine the eye pose more accurately. In some embodiments, the HMD may recognize the particular user by analyzing the captured images, certain features of the eye, or as a result of an authentication of the user.

If the user-specific eye model is available, the process proceeds to operation 330, where the user-specific eye model is used to determine the pose of the eye, based on the captured images or readings derived from the images. If the user-specific eye model is not available (e.g. because the user is not recognized as a known user that was previously enrolled), the process proceeds to operation 340, where a general eye model is used to determine the pose of the eye. A general eye model is not specific to the user, and so the pose determined using the general model may not be as accurate. In some embodiments, the general eye model may be based on an average of features of many users.

Once the eye pose is determined, at operation 350, an apex location (e.g. apex location 212) corresponding to the cornea apex of the eye is determined using the eye pose. The eye pose may fully represent the 3D shape of the eye in space, including the apex of the cornea. In some embodiments, the apex location may be directly output by the eye model. The apex location may be specified in reference coordinate system, which may be centered around the display lens, the camera(s) or other fixed point with respect to the HMD.

At operation 360, a nearest point on the lens in question (e.g. display lens 120 or a clip-on lens 240) to the apex location is determined. In some embodiments, the lens's spatial position and shape may be modeled in a lens model in the same coordinate system of the apex location, and the lens model can be used to determine the nearest point. At operation 370, a nearest distance is determined between the apex location and the nearest point on the lens.

At operation 380, one or more check(s) are made to determine whether the nearest distance is greater or less than one or more distance threshold(s). The distance threshold(s) may specify optimal or preferred distance range(s) from the eye to the lens. In some embodiments, the thresholds may be configurable via a configuration interface of the HMD.

If a distance problem is discovered (e.g. if the nearest distance is outside an acceptable distance range), at operation 390, an alert is output indicating that the lens distance is too close or too far. In some embodiments, the alert may recommend that the user adjust the positioning of the HMD or use a different light seal that is better fit to the user's face. In some embodiments, the HMD may recommend that the user authenticate so that a more accurate user-specific eye model can be used, or enroll as a new user so that a user-specific eye model can be configured. In some embodiments, the HMD may prevent the user from initiating a user session using the HMD if the lens distance test fails. In some embodiments, the alert may be generated visually to the user via the display lens.

As shown, in some embodiments, the lens distance test may be repeated even if the lens distance is determined to be acceptable. For example, the test may be performed for multiple frames to measure the lens distance in multiple eye poses. In some embodiments, if any eye pose fails the test, the alert will be generated. In some embodiments, the alert may be generated based on an average of the measured distances for the different poses, or based on a number of poses that fails the test.

Figure 4:
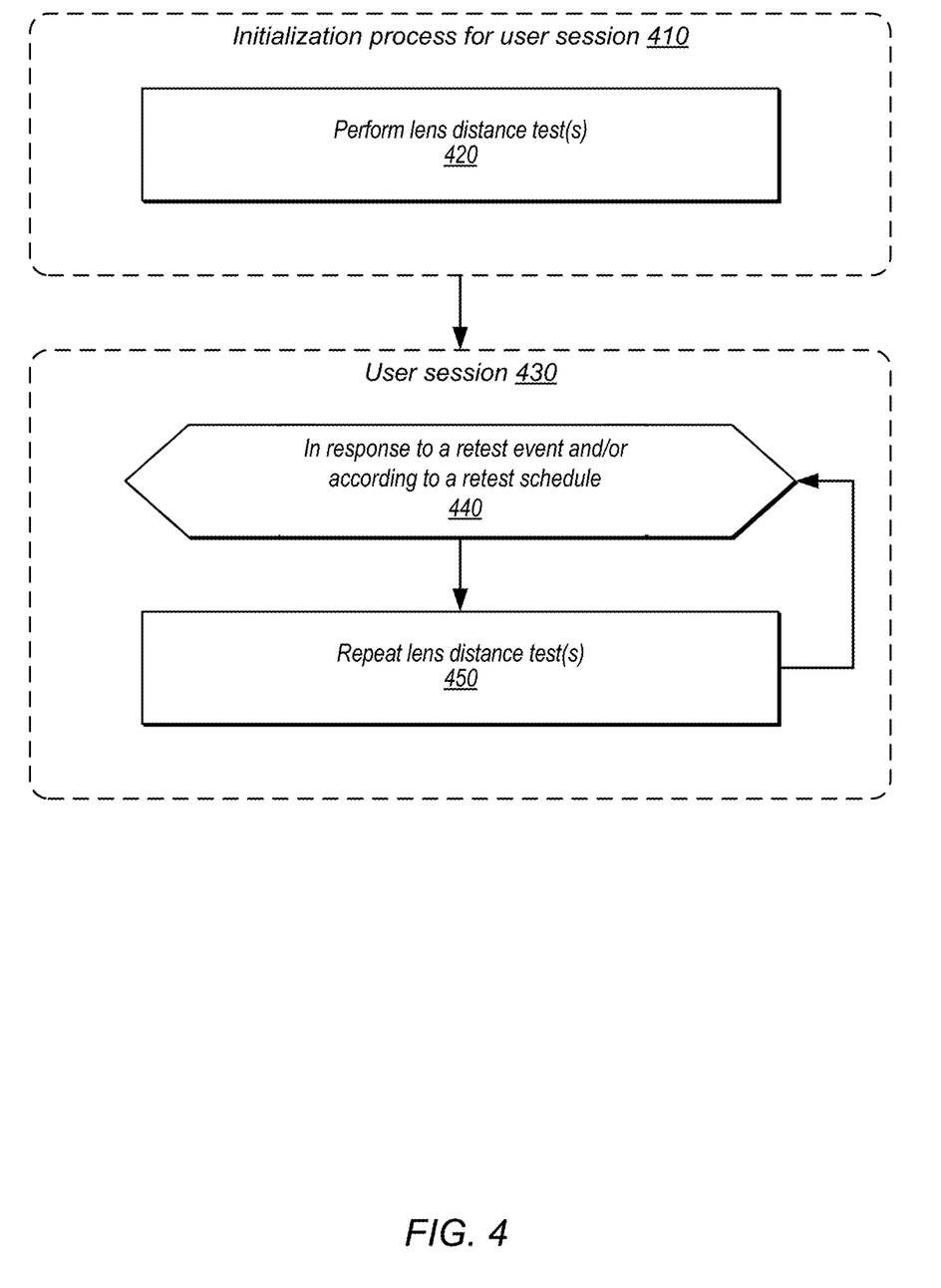
FIG. 4 is a flowchart illustrating a process of repeating the lens distance test using a user session of the HMD, according to some embodiments.

FIG. 4 is a flowchart illustrating a process of repeating the lens distance test using a user session of the HMD, according to some embodiments. The process shown in FIG. 3 may be performed by an embodiment of the HMD 100 of FIG. 1.

As shown, in some embodiments, one or more runs of the lens distance test (e.g. lens distance test 180) may be performed 420 during an initialization process 410 for a user session. This initialization process may occur when a user first puts on (or turns on) the HMD device, when the HMD will configure various settings for the user setting. In some embodiments, the initialization process 410 may occur when the HMD device is switched from one user to another user. As discussed, the lens distance test may be performed multiple times in different poses. In some embodiments, the HMD may perform the lens distance test on the two eyes independently.

Additionally, in some embodiments, the lens distance test may be repeated 450 during the user session 430, for example, as the user is using an AR or VR application executed by the HMD. The retesting may be triggered by one or more events or conditions 440 configured for the HMD. For example, in some embodiments, a retest of the lens distance may be triggered in response to detection of a fall or a significant movement of the user's eyes relative to the HMD. In some embodiments, the lens distance may be retested according to a set schedule (e.g. once a minute), so that the distance can be continuously monitored.

Figure 5:
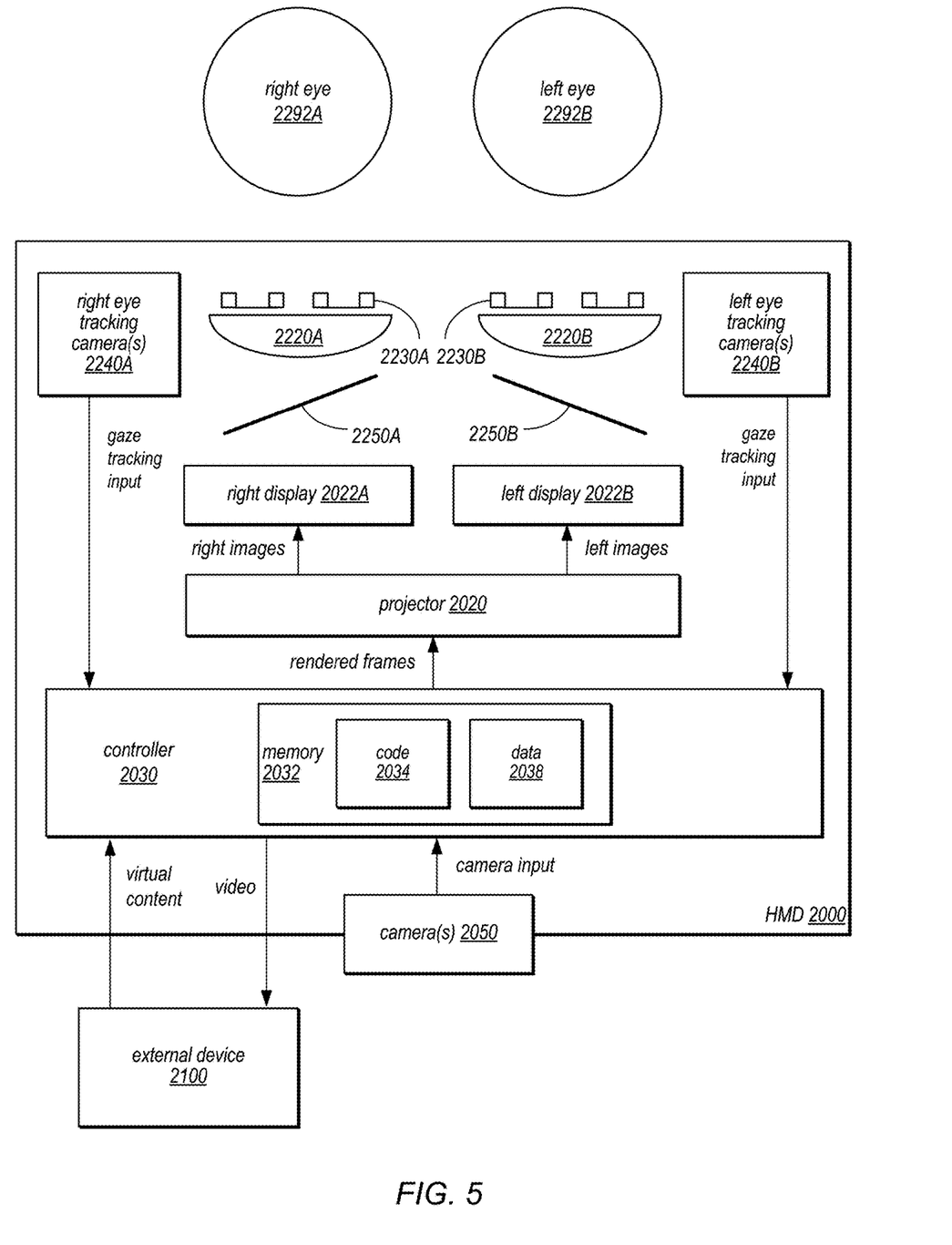
FIG. 5 is a block diagram illustrating various components of an example VR/AR system that implements the lens distance test, according to some embodiments.

FIG. 5 is a block diagram illustrating various components of an example VR/AR system that implements the lens distance test, according to some embodiments. In some embodiments, a VR/AR system may include an HMD 2000 such as a headset, helmet, goggles, or glasses. HMD 2000 may implement any of various types of virtual reality projector technologies. For example, the HMD 2000 may include a VR projection system that includes a projector 2020 that displays frames including left and right images on screens or displays 2022A and 2022B that are viewed by a user through eye lenses 2220A and 2220B. The VR projection system may, for example, be a DLP (digital light processing), LCD (liquid crystal display), or LCoS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 that implements functionality of the VR/AR system and that generates frames (each frame including a left and right image) that are displayed by the projector 2020. In some embodiments, HMD 2000 may also include a memory 2032 that stores software (code 2034) of the VR/AR system that is executable by the controller 2030, as well as data 2038 that may be used by the VR/AR system when executing on the controller 2030. For example, in some embodiments, the code 2034 may include code to execute the lens distance test 180, and the data 2038 may include the captured eye images 230 and the determined nearest distance 220.

In some embodiments, HMD 2000 may also include one or more interfaces (e.g., a Bluetooth technology interface, USB interface, etc.) that communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) that implement any suitable instruction set architecture, and may execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores that each execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more cameras 2050 that capture video of the user's environment for AR applications. In some embodiments, the HMD 2000 may render and display frames to provide an augmented or mixed reality (AR) view for the user at least in part according to camera 2050 inputs. The AR view may include renderings of the user's environment, including renderings of real objects in the user's environment, based on video captured by one or more video cameras 2050 that capture high-quality, high-resolution video of the user's environment for display. In some embodiments, the cameras 2050 may be equipped with autofocus mechanisms. While not shown, in some embodiments, the HMD 2000 may also include one or more sensors that collect information about the user's environment and actions (depth information, lighting information, user motions and gestures, etc.). The cameras 2050 and sensors may provide the information to the controller 2030 of the VR/AR system.

As shown, HMD 2000 may be positioned on the user's head such that the displays 2022A and 2022B and eye lenses 2220A and 2220B are disposed in front of the user's eyes 2292A and 2292B. IR or NIR light sources 2230A and 2230B (e.g., IR or NIR LEDs) may be positioned in the HMD 2000 (e.g., around the eye lenses 2220A and 2220B, or elsewhere in the HMD 2000) to illuminate the user's eyes 2292A and 2292B with IR or NIR light. Eye tracking cameras 2240A and 2240B (e.g., IR or NIR cameras, for example 400×400 pixel count cameras) are located at each side of the user's face, for example at or near the user's cheek bones. Note that the location of eye tracking cameras 2240A and 2240B is given by way of example, and is not intended to be limiting. In some embodiments, there may be a single eye tracking camera 2240 located on each side of the user's face. In some embodiments there may be two or more eye tracking cameras 2240 on each side of the user's face. For example, in some embodiments, a wide-angle camera 2240 and a narrower-angle camera 2240 may be used on each side of the user's face. A portion of IR or NIR light emitted by light sources 2230A and 2230B reflects off the user's eyes 2292A and 2292B either directly to respective eye tracking cameras 2240A and 2240B or via mirrors 2250A and 2250B located between the user's eyes 2292 and the displays 2022, and is captured by the eye tracking cameras 2240A and 2240B to image the user's eyes 2292A and 2292B. Gaze tracking information captured by the cameras 2240A and 2240B may be provided to the controller 2030. The controller 2030 may analyze the gaze tracking information (e.g., images of the user's eyes 2292A and 2292B) to determine gaze direction, eye position and movement, pupil dilation, or other characteristics of the eyes 2292A and 2292B.

The gaze tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B using the glint-assisted methods. The estimated point of gaze may, for example, be used to render virtual content differently based on the determined direction of the user's gaze.

Embodiments of the HMD 2000 as illustrated herein may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B. In some embodiments, for VR applications, the controller 2030 may obtain distance information for virtual content to be displayed on the display panels 2022, and may use this distance information to direct the eye lenses 2220 to adjust focus according to the distance of virtual content that the user is currently looking at according to the gaze tracking information.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A head-mounted display (HMD), comprising:
a lens, wherein the lens is a clip-on lens added to the HMD;
one or more cameras; and
one or more processors configured to perform a lens distance test, including to:
capture, using the one or more cameras, one or more images of an eye;
determine, based at least in part on the one or more images, a pose of the eye;
determine, based at least in part on the pose, a distance between a portion of the eye and the lens, wherein a location of the clip-on lens relative to the HMD is determined during a field calibration performed when the clip-on lens is added to the HMD; and
output a notification in response to a determination that distance is below a threshold.

2. The HMD of claim 1, wherein:
the lens is a display lens configured to project visual content generated by the HMD; and
the notification is output as part of the visual content.

3. The HMD of claim 1, wherein:
the HMD implements a gaze tracking system that tracks a gaze direction of the eye; and
the pose of the eye is determined by the gaze tracking system.

4. The HMD of claim 3, wherein:
the gaze tracking system includes a plurality of light emitting diodes (LEDs) that emit lights towards the eye;
the one or more cameras captures reflections of the lights emitted by the LEDs; and
the pose of the eye is determined based at least in part on the reflections.

5. The HMD of claim 1, wherein to determine the distance between the eye and the lens, the HMD is configured to:
determine, in a coordinate system, an apex location corresponding to a cornea apex of the eye; and
determine, in the coordinate system, a point on the lens that is closest to the apex location.

6. The HMD of claim 1, wherein to determine the pose of the eye, the HMD is configured to:
determine that the eye corresponds to a user-specific eye model of a user; and
use the user-specific eye model to determine the pose.

7. The HMD of claim 1, wherein the pose of the eye is determined using a general eye model that is not specific to a user.

8. The HMD of claim 1, wherein to perform the lens distance test, the HMD is configured to determine the distance for multiple poses of the eye.

9. The HMD of claim 1, wherein the HMD is configured to perform the lens distance test for both eyes of a user.

10. The HMD of claim 1, wherein the HMD is configured to:
perform a second distance test to determine that a second distance between the eye and the lens exceeds a second threshold, and in response:
output a second notification indicating that the eye is too far from the lens.

11. The HMD of claim 1, wherein the HMD is configured to perform the lens distance test during an initialization process for a user session of the HMD.

12. The HMD of claim 11, wherein the HMD is configured to repeat the lens distance test after the initialization process to monitor the distance between the eye and the lens during the user session.

13. A method, comprising:
performing, by a head-mounted display (HMD) implemented using one or more processors, a lens distance test, including:
capturing, using one or more cameras of the HMD, one or more images of an eye;
determining, based at least in part on the one or more images, a pose of the eye;
determining, based at least in part on the pose, a distance between a portion of the eye and a lens of the HMD, wherein the lens is a clip-on lens added to the HMD, and wherein a location of the clip-on lens relative to the HMD is determined during a field calibration performed when the clip-on lens is added to the HMD; and
outputting a notification in response to a determination that distance is below a threshold.

14. The method of claim 13, wherein:
the HMD implements a gaze tracking system that tracks a gaze direction of the eye; and
the pose of the eye is determined by the gaze tracking system.

15. The method of claim 14, wherein:
the gaze tracking system includes a plurality of light emitting diodes (LEDs) that emit lights towards the eye;
the one or more cameras captures reflections of the lights emitted by the LEDs; and
the pose of the eye is determined based at least in part on the reflections.

16. The method of claim 13, wherein determining the distance between the eye and the lens comprises:
determining, in a coordinate system, an apex location corresponding to a cornea apex of the eye; and
determining, in the coordinate system, a point on the lens that is closest to the apex location.

17. The method of claim 13, wherein determining the distance between the eye and the lens comprises:
determining that the eye corresponds to a user-specific eye model of a user; and
using the user-specific eye model to determine the pose.

18. The method of claim 13, wherein performing the lens distance test comprises determining the distance for multiple poses of the eye.

19. One or more non-transitory computer readable media storing program instructions that when executed by one or more processors of a head-mounted display (HMD) cause the HMD to perform a lens distance test, including to:
capture, using one or more cameras of the HMD, one or more images of an eye;
determine, based at least in part on the one or more images, a pose of the eye;

determine, based at least in part on the pose, a distance between a portion the eye and a lens of the HMD, wherein the lens is a clip-on lens added to the HMD, and wherein a location of the clip-on lens relative to the HMD is determined during a field calibration performed when the clip-on lens is added to the HMD; and
output a notification in response to a determination that distance is below a threshold.

* * * * *